(12) United States Patent
Vogel et al.

(10) Patent No.: US 12,487,427 B2
(45) Date of Patent: Dec. 2, 2025

(54) CABLE MOUNTING CLAMPS

(71) Applicant: AFL Telecommunications LLC, Duncan, SC (US)

(72) Inventors: Mark Vogel, Greenville, SC (US); Joseph Cignarale, Greer, SC (US); Wilfred J. Courchaine, Moore, SC (US)

(73) Assignee: AFL Telecommunications LLC, Duncan, SC (US)

( * ) Notice: Subject to any disclaimer, the term of this patent is extended or adjusted under 35 U.S.C. 154(b) by 248 days.

(21) Appl. No.: 18/553,497

(22) PCT Filed: Jan. 4, 2022

(86) PCT No.: PCT/US2022/011110
§ 371 (c)(1),
(2) Date: Sep. 29, 2023

(87) PCT Pub. No.: WO2022/211872
PCT Pub. Date: Oct. 6, 2022

(65) Prior Publication Data
US 2024/0210648 A1      Jun. 27, 2024

Related U.S. Application Data

(60) Provisional application No. 63/244,567, filed on Sep. 15, 2021, provisional application No. 63/174,829, (Continued)

(51) Int. Cl.
*G02B 6/44* (2006.01)
(52) U.S. Cl.
CPC .............................. *G02B 6/44785* (2023.05)
(58) Field of Classification Search
CPC .................................................. G02B 6/44785
See application file for complete search history.

(56) References Cited

U.S. PATENT DOCUMENTS

| 674,999 A | 5/1901 | Copeland |
| 705,391 A | 7/1902 | Davis |

(Continued)

FOREIGN PATENT DOCUMENTS

| EM | 000651260-0001 | 2/2007 |
| EM | 002444604-0002 | 4/2014 |

(Continued)

OTHER PUBLICATIONS

International Patent Application No. PCT/US2022/011110; International Search Report; Apr. 19, 2022; (5 pages).

(Continued)

*Primary Examiner* — Daniel Petkovsek
(74) *Attorney, Agent, or Firm* — Dority & Manning, P.A.

(57) ABSTRACT

A fiber optic distribution enclosure and cable mounting clamp are provided. The enclosure includes a surface having a first bridge extended along a longitudinal direction. The cable mounting clamp including a base removably connectable to the surface. The base includes an outer body which defines an inner channel and a support ramp disposed within the inner channel. The inner channel extends along the longitudinal direction. A tong structure is connected to the base. The tong structure extends along the longitudinal direction and between the inner channel and the surface. A fork structure is slidable along the longitudinal direction and includes a pair of prongs extended along the longitudinal direction. Each prong is in sliding contact with the tong structure. Each prong forms a longitudinal face extending along the longitudinal direction and an angled face extending away from the longitudinal axis and corresponding to an angled face at the tong structure.

20 Claims, 14 Drawing Sheets

Related U.S. Application Data filed on Apr. 14, 2021, provisional application No. 63/168,897, filed on Mar. 31, 2021.

(56) References Cited

U.S. PATENT DOCUMENTS

| | | | |
|---|---|---|---|
| 2,373,328 A | 4/1945 | Morehouse |
| 2,491,290 A | 12/1949 | Tinnerman |
| 3,173,638 A | 3/1965 | Neale, Sr. |
| 3,632,071 A | 1/1972 | Camero |
| 4,366,938 A | 1/1983 | McSpadden |
| 4,397,435 A | 8/1983 | Fisher |
| 4,518,138 A | 5/1985 | Stutenkemper et al. |
| 4,700,432 A | 10/1987 | Fennell |
| 4,750,241 A | 6/1988 | Powell |
| 5,368,261 A | 11/1994 | Caveney |
| 5,390,883 A | 2/1995 | Songhurst |
| 5,752,682 A | 5/1998 | Anderson |
| 5,787,219 A | 7/1998 | Mueller |
| 5,835,660 A | 11/1998 | Jung et al. |
| 5,873,550 A | 2/1999 | Phillips |
| 6,367,745 B1 | 4/2002 | Winton, III |
| 6,595,473 B2 | 7/2003 | Aoki et al. |
| 6,636,680 B2 | 10/2003 | Wu et al. |
| 6,668,865 B2 | 12/2003 | Miyamoto et al. |
| 6,683,258 B1 | 1/2004 | Tracy |
| 6,684,021 B2 | 1/2004 | Wu et al. |
| 6,717,055 B2 | 4/2004 | Kato et al. |
| 6,728,462 B2 | 4/2004 | Wu et al. |
| 6,732,764 B2 | 5/2004 | Miyamoto et al. |
| 6,763,172 B2 | 7/2004 | Sahlin |
| 6,853,796 B2 | 2/2005 | Vastmans et al. |
| 6,892,990 B2 | 5/2005 | Pisczak |
| 6,968,864 B2 | 11/2005 | Miyamoto et al. |
| 7,109,421 B2 | 9/2006 | Sekino et al. |
| 7,330,629 B2 | 2/2008 | Cooke et al. |
| 7,340,803 B2 | 3/2008 | Howell |
| 7,369,740 B2 | 5/2008 | Tinucci |
| 7,556,225 B2 | 7/2009 | Riedy et al. |
| 7,558,459 B2 | 7/2009 | Carpenter et al. |
| 7,588,216 B1 | 9/2009 | Hoyl |
| 7,613,376 B2 | 11/2009 | Wright et al. |
| 7,692,095 B2 | 4/2010 | Katsumata et al. |
| 7,711,235 B2 | 5/2010 | Riggsby et al. |
| 7,939,759 B2 | 5/2011 | Henry |
| 7,945,136 B2 | 5/2011 | Cooke et al. |
| 8,038,167 B2 | 10/2011 | Slobodecki et al. |
| 8,135,257 B2 | 3/2012 | Cooke et al. |
| 8,218,936 B2 | 7/2012 | Sek |
| 8,366,059 B2 | 2/2013 | Fannon et al. |
| 8,538,227 B2 | 9/2013 | Cowen et al. |
| 8,737,797 B2 | 5/2014 | Kubinski et al. |
| 8,953,924 B2 | 2/2015 | Cote et al. |
| 9,002,167 B2 | 4/2015 | Rathod et al. |
| 9,009,923 B2 | 4/2015 | Rouleau |
| 9,059,578 B2 | 6/2015 | Sokolowski et al. |
| 9,256,042 B2 | 2/2016 | Vastmans |
| 9,441,763 B2 | 9/2016 | Denner et al. |
| 9,488,298 B2 | 11/2016 | Calvert |
| 9,539,959 B2 | 1/2017 | Matsumura |
| 9,556,972 B2 | 1/2017 | White |
| 9,862,337 B2 | 1/2018 | Inao et al. |
| 9,939,601 B2 | 4/2018 | Sievers et al. |
| 10,012,330 B1 | 7/2018 | Thomas et al. |
| 10,033,175 B1 | 7/2018 | Schumacher |
| 10,109,960 B2 | 10/2018 | Casses |
| 10,174,779 B2 | 1/2019 | Friedrich et al. |
| 10,295,084 B2 | 5/2019 | Izawa et al. |
| 10,439,381 B1 | 10/2019 | Mohlman |
| 10,509,191 B2 | 12/2019 | Bishop |
| 10,589,691 B2 | 3/2020 | Rouleau |
| 10,730,674 B2 | 8/2020 | Wintz |
| 10,761,285 B2 | 9/2020 | Courchaine et al. |
| 10,828,472 B2 | 11/2020 | Kappler |
| 10,935,748 B2 | 3/2021 | Cams |
| 11,402,597 B2 * | 8/2022 | Courchaine ........ G02B 6/44526 |
| 2005/0258315 A1 | 11/2005 | Bigham |
| 2009/0241300 A1 | 10/2009 | Ferguson |
| 2013/0175410 A1 | 7/2013 | Caveney |
| 2014/0151514 A1 | 6/2014 | Asai |
| 2015/0159780 A1 | 6/2015 | Kato et al. |
| 2016/0121822 A1 | 5/2016 | Shaw |
| 2019/0071035 A1 | 3/2019 | Sekino et al. |
| 2020/0194987 A1 | 6/2020 | Gu et al. |
| 2021/0103111 A1 | 4/2021 | Cams et al. |
| 2021/0122307 A1 | 4/2021 | Onodera |
| 2021/0148488 A1 | 5/2021 | Hwang |
| 2021/0181448 A1 | 6/2021 | Van Baelen et al. |
| 2021/0181449 A1 | 6/2021 | Van Baelen et al. |

FOREIGN PATENT DOCUMENTS

| | | | |
|---|---|---|---|
| EP | 2060369 A1 | 5/2009 | |
| EP | 2437090 A1 | 4/2012 | |
| EP | 2772450 A1 | 9/2014 | |
| EP | 3537198 B1 | 9/2019 | |
| EP | 3637570 A1 | 4/2020 | |
| EP | 3736614 A4 | 11/2020 | |
| EP | 4057040 A1 * | 9/2022 | ......... G02B 6/44785 |
| JP | 2003348738 A | 12/2003 | |
| JP | 2020154168 A | 9/2020 | |
| WO | WO02/06714 A1 | 1/2002 | |
| WO | WO2005/106304 A1 | 11/2005 | |
| WO | WO2019079460 A1 | 4/2019 | |
| WO | WO2019081763 A1 | 5/2019 | |
| WO | WO2019101950 A1 | 5/2019 | |
| WO | WO2019110979 A1 | 6/2019 | |
| WO | WO2020043914 A1 | 3/2020 | |
| WO | WO2020154418 A1 | 7/2020 | |
| WO | WO2020249656 A1 | 12/2020 | |
| WO | WO2021/055282 A1 | 3/2021 | |
| WO | WO2021045909 A1 | 3/2021 | |
| WO | WO2021092177 A1 | 5/2021 | |

OTHER PUBLICATIONS

International Search Report Corresponding to Application No. PCT/US2022/011110 on Apr. 19, 2022.

* cited by examiner

CABLE MOUNTING CLAMPS

CROSS-REFERENCE TO RELATED APPLICATIONS

The present application is a National Stage Patent Application of PCT/US2022/011110, filed on Jan. 4, 2022, which claims priority to U.S. Patent Application Ser. No. 63/168,897 having a filing date of Mar. 31, 2021, to U.S. Patent Application Ser. No. 63/174,829 having a filing date of Apr. 14, 2021, and to U.S. Patent Application Ser. No. 63/244,567 having a filing date of Sep. 15, 2021, which are incorporated by reference herein in their entireties.

FIELD

The present disclosure relates generally to cable mounting clamps, such as for mounting cables to enclosure.

BACKGROUND

Secure mounting of cables during installation thereof is a necessity in a variety of environments. One such environment is in fiber optics, and in particular in the fiber optic inside office environment. In such environment, fiber optic distribution enclosures are utilized to manage optical fiber distribution. An enclosure typically accommodates one or more fiber trays, each of which includes one or more cassettes. Within a cassette, an incoming optical fiber may be spliced, split, etc., and outgoing optical fibers may be connected to the cassette and incoming optical fibers to provide fiber optic connections within the inside office environment. The incoming cables which include incoming optical fibers must be secured to the enclosures to facilitate secure, reliable connections.

Accordingly, improved cable mounting clamps are desired. For example, cable mounting clamps which include features for relieving torsional or bending stresses in associated cables would be advantageous.

BRIEF DESCRIPTION

Aspects and advantages of the invention will be set forth in part in the following description, or may be obvious from the description, or may be learned through practice of the invention.

In accordance with one embodiment, a cable mounting clamp for mounting a cable to a surface is provided. The cable mounting clamp includes a base removably connectable to the surface. The base includes an outer body which defines an inner channel and a support ramp disposed within the inner channel, the inner channel extending along a longitudinal direction. A tong structure is connected to the base and extending along the longitudinal direction and between the inner channel and the surface. A fork structure is slidable along the longitudinal direction and includes a pair of prongs extended along the longitudinal direction. Each prong is in sliding contact with the tong structure and forms a longitudinal face extending along the longitudinal direction. Each prong forms an angled face extending away from the longitudinal axis and corresponding to an angled face at the tong structure.

In accordance with another embodiment, a fiber optic distribution enclosure for a fiber optic cable. The enclosure includes a roller tube configured to surround the cable. The roller tube includes a first bridge extending co-directional to an extension of the cable through the roller tube. A surface for mounting the cable is included. A second bridge is formed at the surface in which the second bridge is extending substantially co-directional to the first bridge at the roller tube. A strap is configured to extend at least partially around the roller tube and through the first bridge and the second bridge.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF FIGURES

A full and enabling disclosure of the present invention, including the best mode thereof, directed to one of ordinary skill in the art, is set forth in the specification, which makes reference to the appended figures, in which.

DETAILED DESCRIPTION

Figure 1:
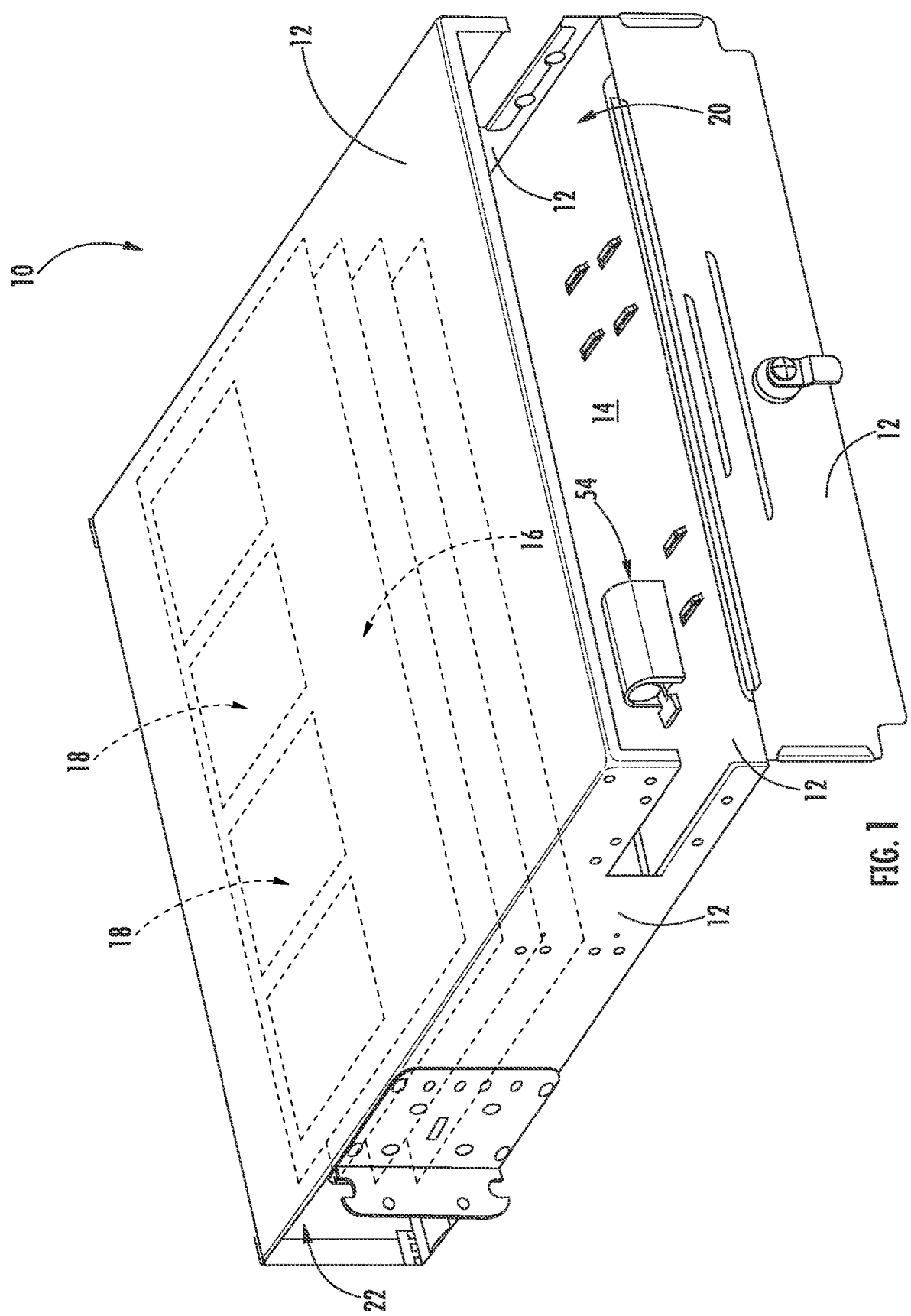
FIG. 1 is a rear perspective view of a fiber optic distribution enclosure in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, references to a longitudinal axis may include references to a direction parallel or co-directional to the longitudinal axis, referred to herein as a longitudinal direction.

Cable mounting clamps in accordance with various embodiments of the present disclosure are shown and described herein.

Embodiments of cable mount clamps provided herein allow for improved mounting and installation, such as allowing for installation without the use of tools or mechanical fasteners when mounting the clamp and cable to the enclosure surface. Embodiments provided herein allow for mechanical retention without of a cable mounting base to a surface of the enclosure via a springing tong structure and an insertable fork structure.

Embodiments provided herein may allow for improved positional maneuverability to accommodate breakout lengths. Certain embodiments including hook and loop straps may allow for bridge lance positions at the roller tube to have a range of distances or orientations relative to bridge lances formed at the mount surface of the fiber optic distribution enclosure. More bridge lance positions can be added to address additional, smaller size trunk cables, in contrast to clips that take up more space and require two or more bridge lances.

Cable mounting clamps in accordance with the present disclosure may further include one or more features as disclosed in U.S. patent application Ser. No. 15/862,225 filed Jan. 4, 2018 and/or U.S. patent application Ser. No. 17/077,500 filed Oct. 22, 2020, the disclosures of both of which are incorporated by reference herein.

Referring now to FIG. 1, one embodiment of a fiber optic distribution enclosure 10 is provided. Fiber optic distribution enclosures 10 are generally utilized to manage optical fiber distribution, typically in inside office environments. Enclosure 10 includes one or more walls 12, as shown, which define an interior 14 of the enclosure. Within the enclosure, one or more trays 16 may be housed. Each tray 16 may include one or more cassettes 18.

In general, an incoming fiber optic cable which includes a plurality of optical fibers may enter the interior 14 of the enclosure 10 via a first opening, such as a rear opening 20, defined by the walls 12. Optical fibers of the incoming fiber optic cable may extend from the cable within the interior 14. These optical fibers may be routed into one or more of the cassettes 18, and spliced, split, etc. within the cassettes 18. Outgoing optical fibers may also be routed to the cassettes 18, and connected to the incoming optical fibers via splicing, splitting, etc. These outgoing optical fibers may be routed from the cassettes 18, and may exit the interior 14 of the enclosure 10 via a second opening, such as a front opening 22, of the enclosure 10.

The incoming fiber optic cable must be secured to the enclosure 10 to facilitate secure, reliable connections of the incoming optical fibers, and to mitigate the risk of breaking or damaging such incoming optical fibers. Accordingly, the present disclosure is directed to cable assemblies 50 which are mountable to surfaces, such to the walls 12 of enclosures 10, and fiber optic distribution enclosures 10 including cable assemblies 50 as depicted and described herein.

Figure 2:
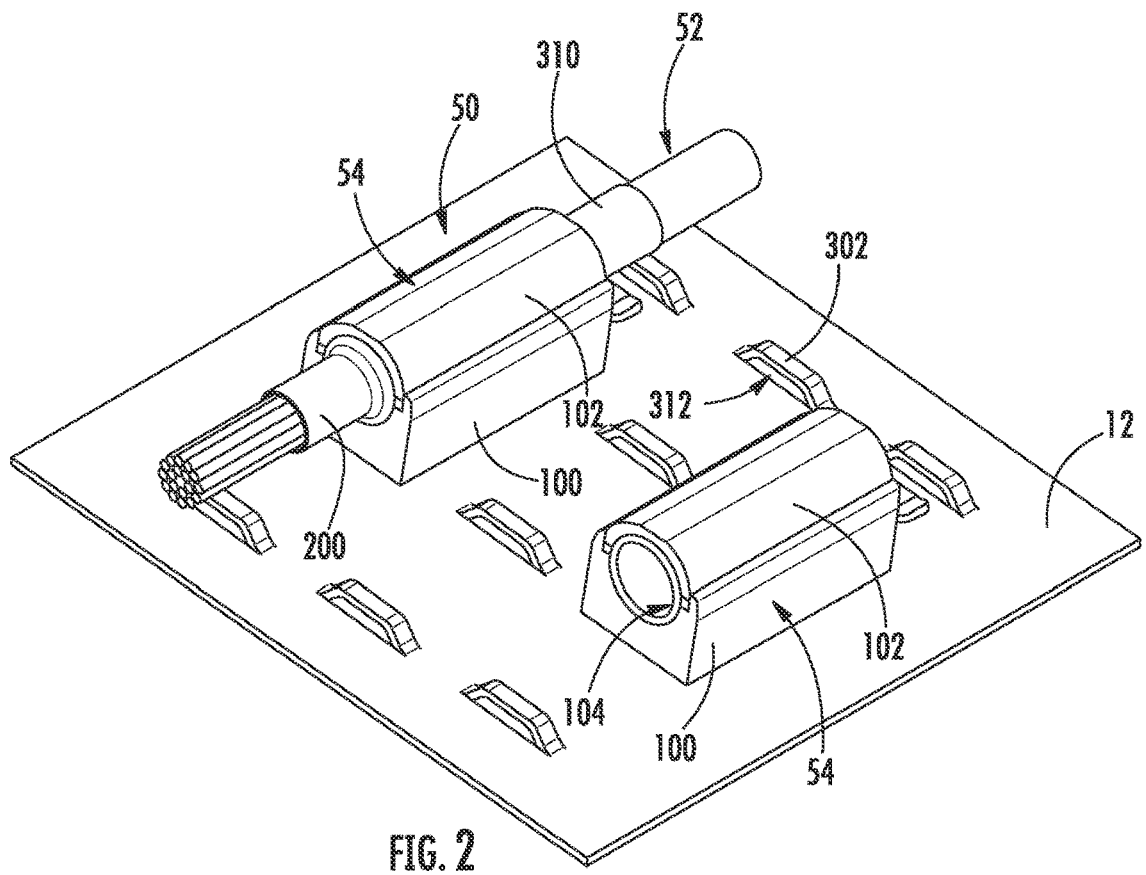
FIG. 2 is a top perspective view of a cable assembly and cable mounting clamp mounted to a wall of a fiber optic distribution enclosure in accordance with embodiments of the present disclosure.
Figure 3:
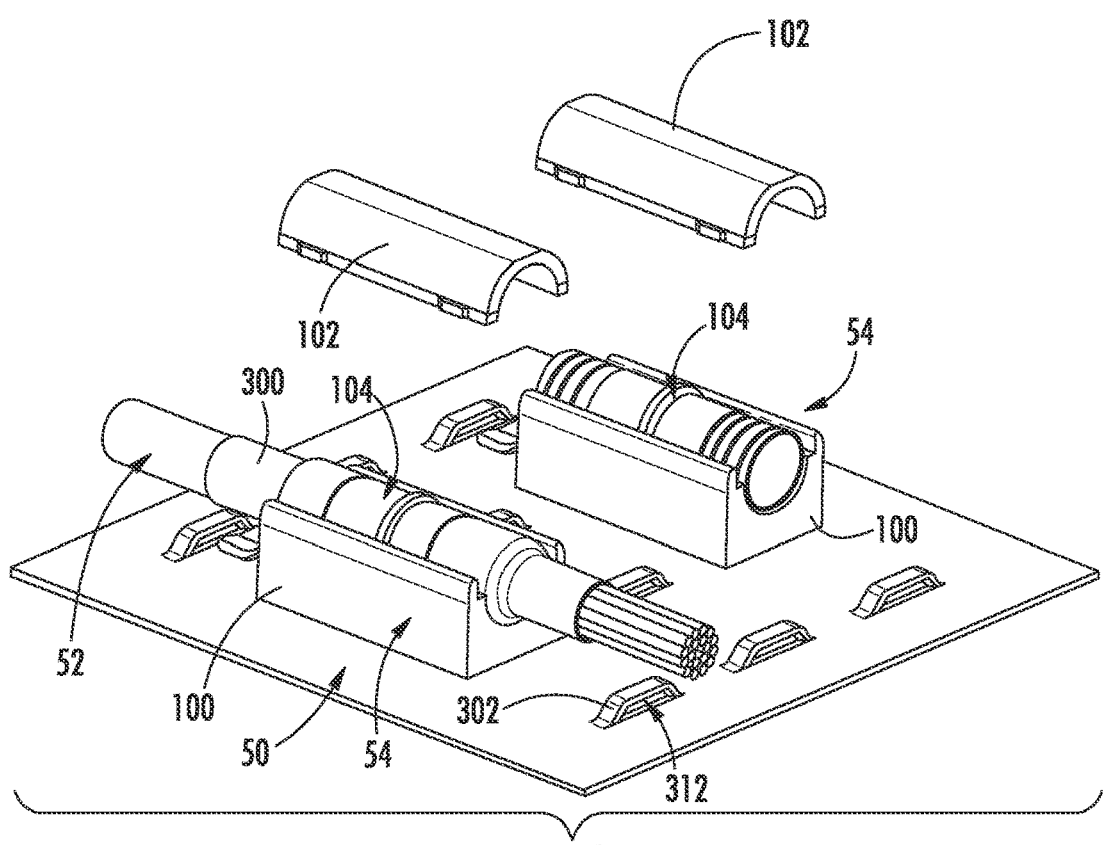
FIG. 3 is a top perspective view of a cable assembly and cable mounting clamp mounted to a wall of a fiber optic distribution enclosure, with caps exploded therefrom, in accordance with embodiments of the present disclosure.

Referring to FIGS. 2-3, a cable assembly 50 in accordance with the present disclosure includes a cable 52 and one or more cable mounting clamps 54. The cable mounting clamp(s) 54 securely and removably mount the cable 52 to an associated surface, such as in exemplary embodiments a wall 12 of an enclosure 10. Such secure, removable mounting is a direct mounting, with direct contact between the clamp 54 and surface (such as the wall 12), thus eliminating the need for additional mounting plates, etc. to be installed (such as in the enclosure 10). Cable mounting clamps 54 in accordance with the present disclosure advantageously facilitate efficient mounting and removal of cables 52, and further advantageously facilitate relief of torsional or bending stresses in the cables 52. Cable mounting clamps 54 in accordance with the present disclosure are particularly advantageous when multiple mounting locations are required for a cable 52 (and/or smaller furcated subassemblies thereof). The use of such cable mounting clamps 54 can significantly reduce cable torsional or bending stress issues, and can also advantageously improve ease of assembly by providing increased tolerances for the cable mounting clamp 54 locations relative to each other.

Referring now to FIG. 4-19, various embodiments of cable assemblies 50 and cable mounting clamps 54 in accordance with the present disclosure are provided. In general, a cable mounting clamp 54 in accordance with the present disclosure may include a base 100. Base 100 may generally be removably connectable to a surface (such as a wall 12) to securely and removable mount the clamp 54 to the surface. In certain embodiments, the cable mounting clamp 54 may include a roller tube 104, such as depicted in FIGS. 2-3. Still various embodiments of the cable mounting clamp 54 may include a cap 102 positioned on top of the cable 52 and/or roller tube 104 and secured to the base 100. Roller tube 104 may generally be mounted to the base 100, such as positioned between the base 100 and cap 102 and/or removably secured to the base 100. Roller tube 104 may advantageously be translatable along an axis of the clamp 54 relative to the base 100, and may facilitate translation of a cable 52 disposed therein. Further, in some embodiments, roller tube 104 may be rotatable about the axis of the clamp 54, and may facilitate rotation of a cable 52 disposed therein. Cable 52 may extend through the roller tube 104 and between the base 100 and cap 102, and may advantageously be translatable (and, optionally, rotatable) relative to the base 100 with the roller tube 104.

Base 100 generally includes an outer body 110 which defines an inner channel 112. The inner channel 112 extends along an axis 56 of the clamp 54. In exemplary embodiments, the axis 56 is a longitudinal axis 56 of the clamp 54. A support ramp 114, which may be or include an inner surface of the base 100, may be disposed within and may partially define the inner channel 112. Support ramp 114 may have an arcuate shape about the axis 56, and thus for example be an arcuate surface as shown.

The roller tube 104 may be positionable within (and, when assembled, disposed within) the inner channel 112. Further, the roller tube 104 may be moveable mounted on the support ramp 114, such as in exemplary embodiments translatable along the axis 56 relative to the support ramp 114. For example, roller tube 104 may be positioned in the inner channel 112 such that the roller tube 104 extends along the axis 56. Further, the roller tube 104 may be in contact with the support ramp 114. Translation along the axis 56 may be relative to both the base 100 and the cap 102 (if utilized).

Base 100 forms a fork opening 120 configured to receive a fork structure 200. The fork structure 200 is slidable along the longitudinal axis 56 through the fork opening 120. Base 100 may form a pair of fork openings 120 corresponding to a pair of prongs 202 of the fork structure 200. The prongs 202 are extended along the longitudinal axis 56. The fork opening 120 forms a pathway through which the prongs 202 of the fork structure 200 are extendable. Accordingly, the fork opening 120 is configured to receive the prong 202 of the fork structure 200 along the longitudinal axis 56 when the fork structure 200 is inserted through the base 100.

A tong structure 140 is connected to base 100. In certain embodiments, the base 100 and the tong structure 140 together form an integral, unitary structure, and the fork structure 200 is separable from the base 100 and the tong structure 140. The tong structure 140 is extending along the longitudinal axis 56 and positioned between the inner channel 112 and the surface, such as the walls 12 of enclosure 10 depicted in FIGS. 2-3. The tong structure 140 includes a pair of members 142 each extending substantially along the longitudinal axis 56. Each member 142 forms a tooth 144 at a terminal end of each member 142. The terminal end may generally be defined as distal along the longitudinal axis 56 from which the fork structure 200 is inserted through the fork opening 120.

The members 142 of the tong structure 140 are sprung along an orthogonal direction relative to the longitudinal axis 56. In particular embodiments, when sliding or otherwise inserting the fork structure 200 into the base 100 via the fork openings 120, a substantially flat or longitudinal face 204 of the prongs 202 relative to the longitudinal axis 56 presses against the members 142 of the tong structure 140. The prongs 202 of the fork structure 200 apply a force at the members 142 toward the longitudinal axis 56, such as a compressive force pressing the teeth 144 toward one another. Without the fork structure 200 inserted into the base 100, the members 142 are extending away from the longitudinal axis 56. In various embodiments, the prong 202 includes an angled face 146 corresponding to the members 142 of the tong structure 140. Angled face 206 at prong 202 extends away from the longitudinal axis 56 from an end proximate to the fork opening 120 through which the fork structure 200 is inserted. Angled face 206 at prong 202 corresponds to angled face 146 at the member 142.

In various embodiments, the fork structure 200 includes a tab or stop wall 208 extending along a height direction up from the surface. The prongs 202 extend along the longitudinal direction from the stop wall 208. The stop wall 208 may further form a tab, wing, or other feature at which a user grabs the fork structure 200 and desirably insert and remove the fork structure 200 from the base 100.

The fork structure 200 may form a hook 210 at a distal end of the prong 202 from the stop wall 208. In certain embodiments, the distal end of the angled face 206 forms a substantially 90 degree bend forming the hook 210. The hook 210 at the fork structure 200 may be configured to latch or catch onto a wall 163 (FIG. 6) extended along a height from the surface. The wall 163 may form a pillar or column supporting the support ramp 114 from a platform 160 configured to abut the surface.

When the fork structure 200 is inserted into base 100, each prong 202 is in sliding contact with the tong structure 140. The angled faces 146, 206 slide across one another until the longitudinal face 204 of the prong 202 contacts the member 142 of the tong structure 140, As the longitudinal face 204 slides across the tong structure 140, the prong 202 pushes or compresses the members 142 toward one another, such as toward the longitudinal axis 56. The stop wall 208 may form a surface configured to limit further extension of the prongs 202 into the base 100. Additionally, or alternatively, hooks 210 may latch onto the base 100 and affix the base 100 onto the surface, such as further described herein.

Embodiments of the fork structure 200 provided herein may be fully removeable from the base 100. In particular, prongs 202 at the fork structure 200 are fully insertable through the fork opening 120 at the base 100. Embodiments of the stop wall 208 may abut the base 100 when the prongs 202 are fully inserted through the fork opening 120 at the base 100.

Figure 4:
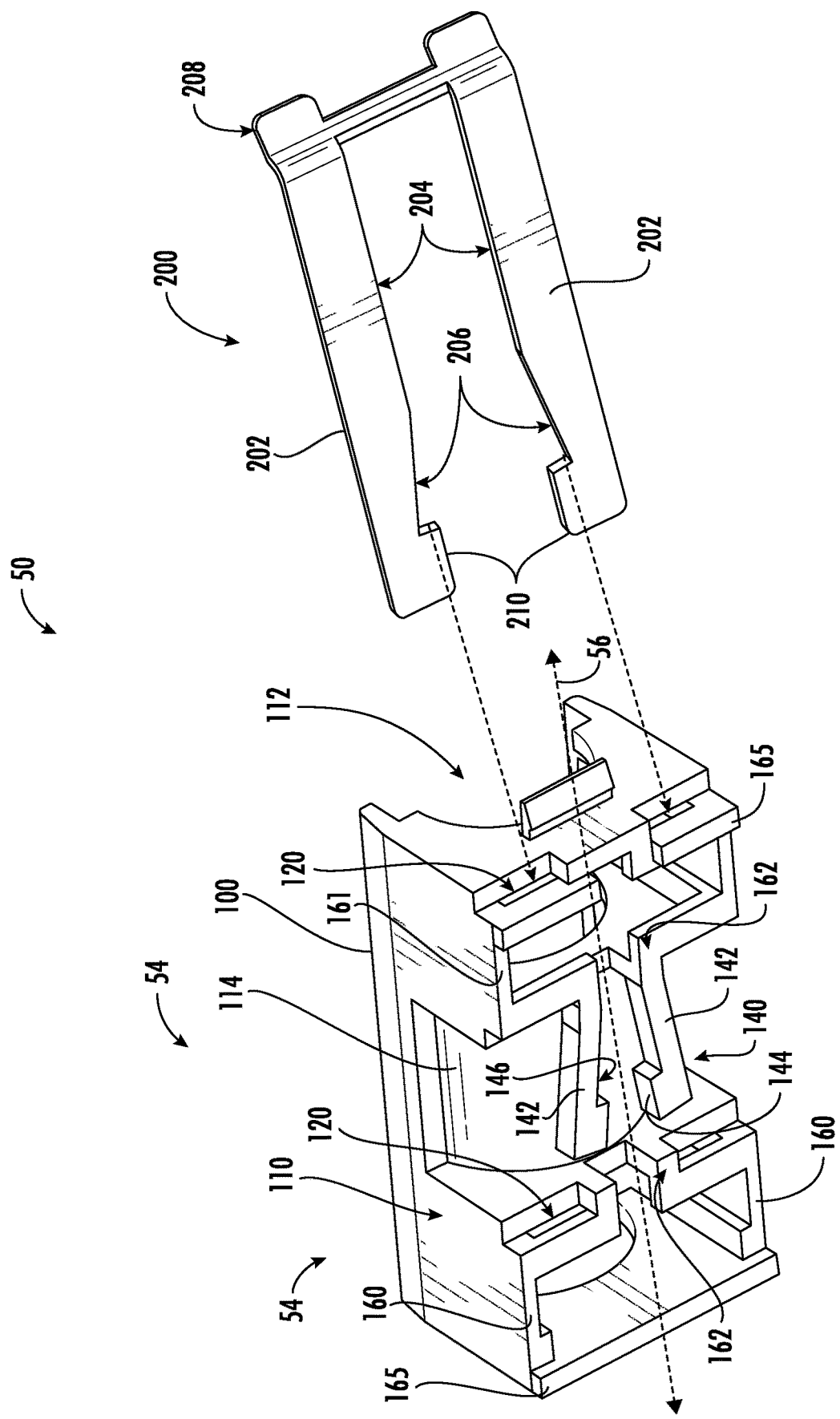
FIG. 4 is a bottom perspective view of a cable mounting clamp in accordance with embodiments of the present disclosure.
Figure 5:
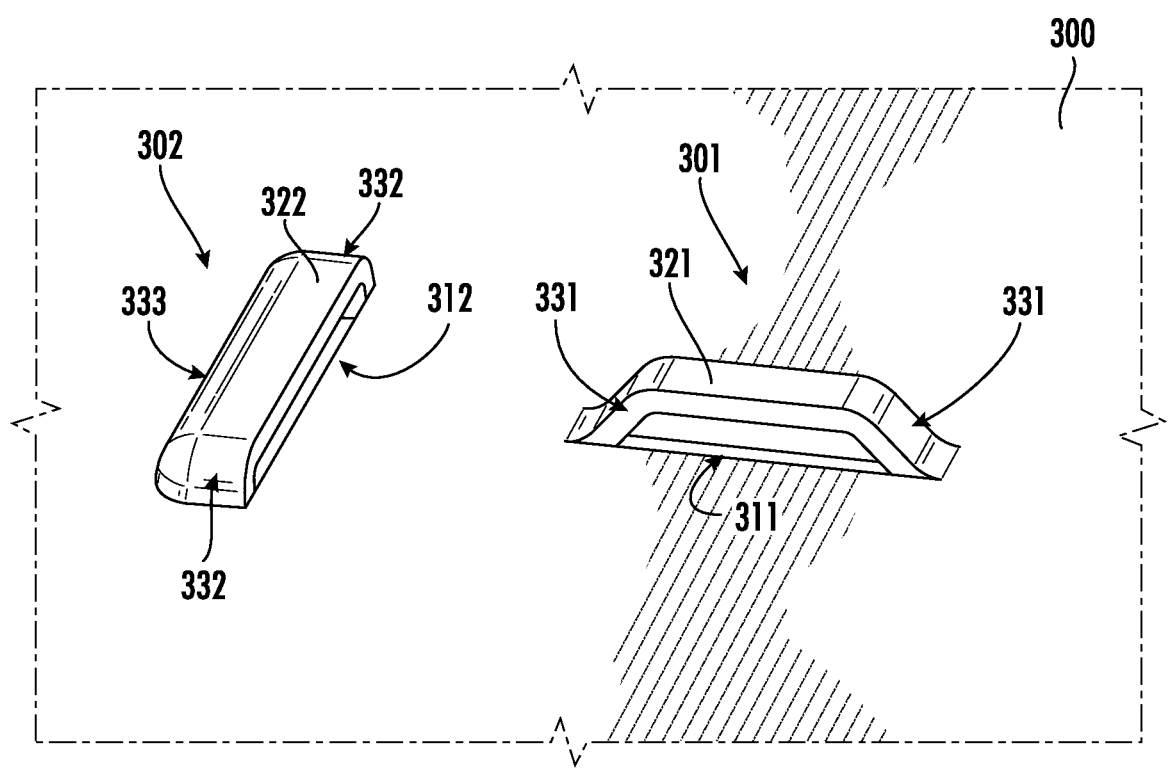
FIG. 5 is a perspective view of an embodiment of a surface of the enclosure at which the cable mounting clamp is attachable in accordance with embodiments of the present disclosure.

Referring now to FIG. 5, exemplary embodiments of a surface 300 is provided. Embodiments provided in FIG. 5 may be configured as one or more walls 12 of the enclosure 10 depicted and described with regard to FIGS. 1-3. The surface 300 includes one or more bridge lances at which the clamp 54 may be removably coupled. The surface 300 forms a first bridge 301 extended along a longitudinal direction co-directional to the longitudinal axis 56 of the cable mounting clamp 54 (FIG. 4). The first bridge 301 includes a member 321 raised from an end wall 331 along a height from the surface 300 to form a first bridge opening 311 between the surface 300 and the member 321. The first bridge opening 311 extends at least partially underneath the member 321. In some embodiments, the first bridge opening 311 extends entirely through the volume between the surface 300 and the member 321.

In certain embodiments, the surface 300 further includes a second bridge 302 extending non-parallel to the first bridge 301. The second bridge 302 may include a member 322 raised from an end wall 332 along a height from the surface 300, such as described with regard to the first bridge 301. The second bridge 302 forms a second bridge opening 312 such as described with regard to the first bridge opening 311. In particular embodiments, the second bridge 302 may include a sidewall 333. The sidewall 333 may extend from the member 322, or additionally from the end wall 332, to the surface 300, such as to form a cap at least partially along the distance of the member 322. The sidewall 333 may particularly form a terminal end of the second bridge opening 312.

Figure 6:
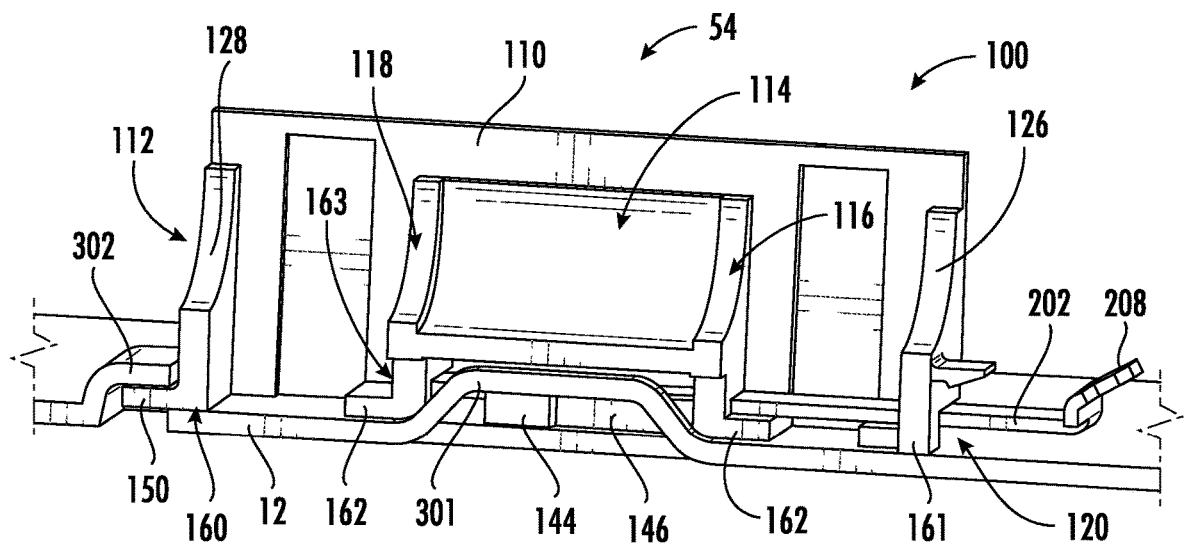
FIG. 6 is a perspective cross-sectional view of an embodiment of the cable mounting clamp in accordance with embodiments of the present disclosure.

Referring now to FIG. 6, an exemplary embodiment of the cable mounting clamp 54 is provided. FIG. 6 provides a perspective cross sectional view of the cable mounting clamp 54 cut along the longitudinal axis 56 and affixed to the surface 300 at the first bridge 301 and the second bridge 302. The fork structure 200 is partially extended into the fork opening 120 at the base 100, such as to compress or clamp the tong structure 140 at the first bridge 301.

Figure 7:
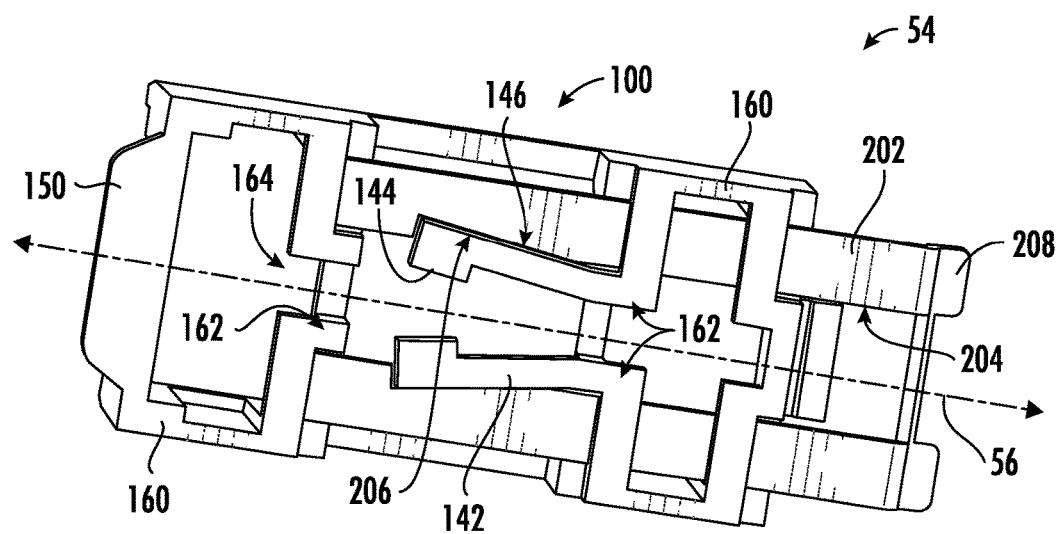
FIG. 7 is a bottom perspective view of an embodiment of the cable mounting clamp in accordance with embodiments of the present disclosure.

Referring now to FIG. 7, a perspective view of an embodiment of the cable mounting clamp 54 viewed from the bottom is provided. In various embodiments, such as depicted in FIG. 4, FIG. 6, and FIG. 7, the base 100 includes a platform 160 at which the base 100 contacts the surface 300. The platform 160 may be positioned at any appropriate portion of the base 100 to provide static support and coupling with the surface 300. The platform 160 may be positioned at terminal ends of the support ramp 114 along the longitudinal direction. The platform 160 may additionally, or alternatively, be positioned at or extended from terminal ends of the outer body 110. The base 100 may accordingly include a pair of platforms 160 at opposing ends along the longitudinal axis 56.

The tong structure 140 may extend along the longitudinal direction between the pair of platforms 160. In particular embodiments, the platforms 160 formed at the base 100 include a forward platform 161 through which the fork structure 200 is initially inserted or slid along the longitudinal direction through corresponding fork openings 120. The base 100 may form a wall 162 extending along the longitudinal direction and forming a channel 164 through which the first bridge 301 is positionable, such as depicted in FIG. 6. The wall 162 may form boundaries or retention features configured to react against the first bridge 301, such as to prevent movement of the base 100 perpendicular, lateral, or orthogonal to the longitudinal axis 56. When the fork structure 200 is inserted into the base 100, the longitudinal faces 204 may push the teeth 144 at the tong structure 140 toward one another at the channel 164. The teeth 144 may then be restrained within the first bridge opening 311 between the end walls 331 of the first bridge 301. Movement of the cable mounting clamp 54 along the longitudinal axis 56 may be limited accordingly.

Figure 8:
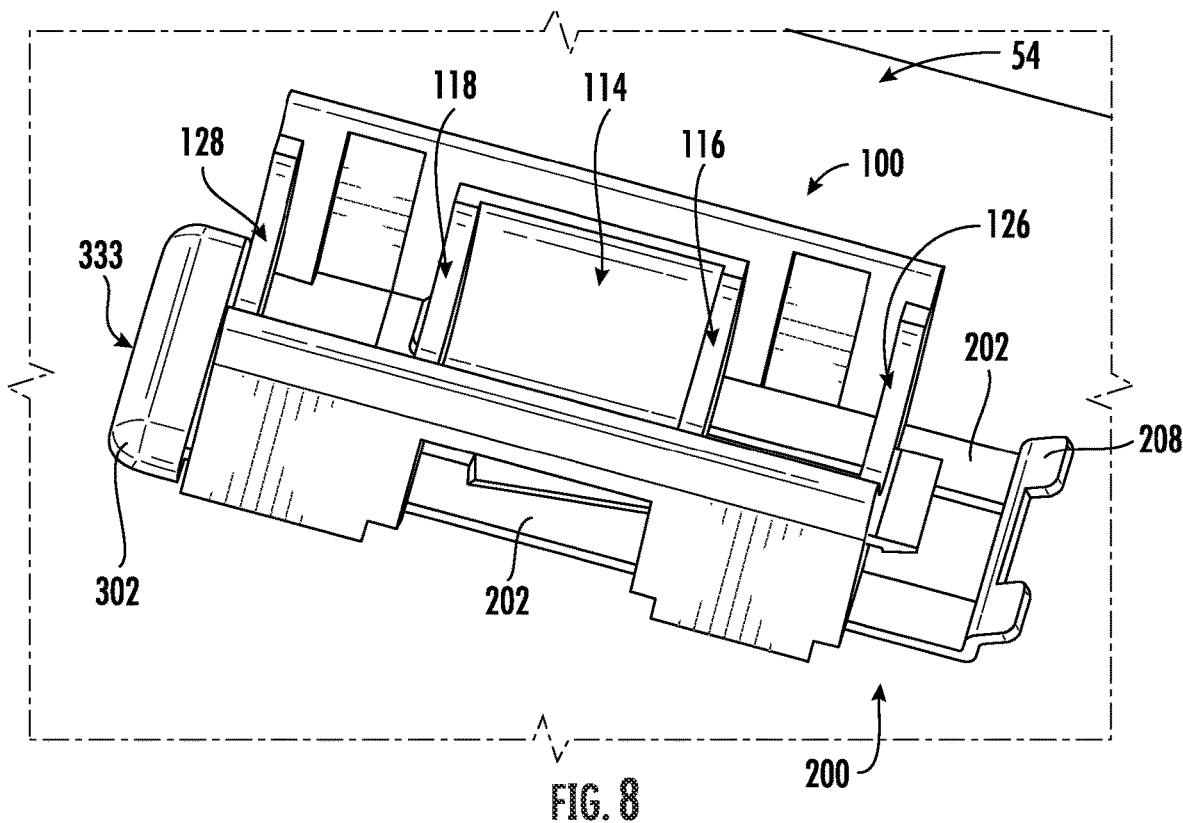
FIG. 8 is a perspective view of an embodiment of the cable mounting clamp in a partially inserted position accordance with embodiments of the present disclosure.
Figure 9:
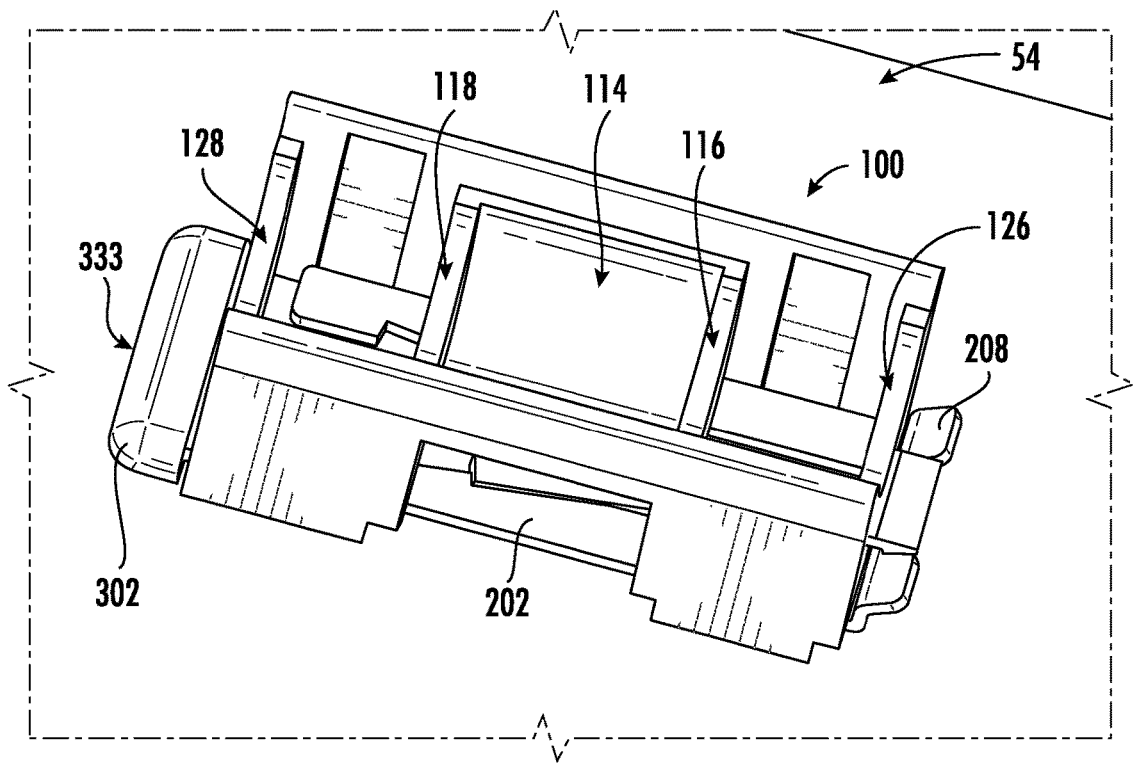
FIG. 9 is a perspective view of an embodiment of the cable mounting clamp in a fully inserted position accordance with embodiments of the present disclosure.

Referring still to FIGS. 6-7, and further depicted in the perspective views in FIG. 8-9, certain embodiments of the base 100 include a retaining wall 150 corresponding to the second bridge 302. The retaining wall 150 is extending along the longitudinal direction from the platform 160 into the second bridge opening 312. The sidewall 333 of the second bridge 302 may restrict or limit movement of the base 100 by forming a terminal end at which the retaining wall 150 may contact. The second bridge 302 may form a pivot point at which the retaining wall 150 is inserted into the second bridge 302. In an exemplary embodiment, the cable mounting clamp 54 may form a "rock and lock" setup at which the retaining wall 150 is inserted into the second bridge 302 at an angle relative to the surface 300, then the cable mounting clamp 54 is pivoted or rocked downward onto the surface 300 before the tong structure 140 engages the first bridge 301.

Figure 10:
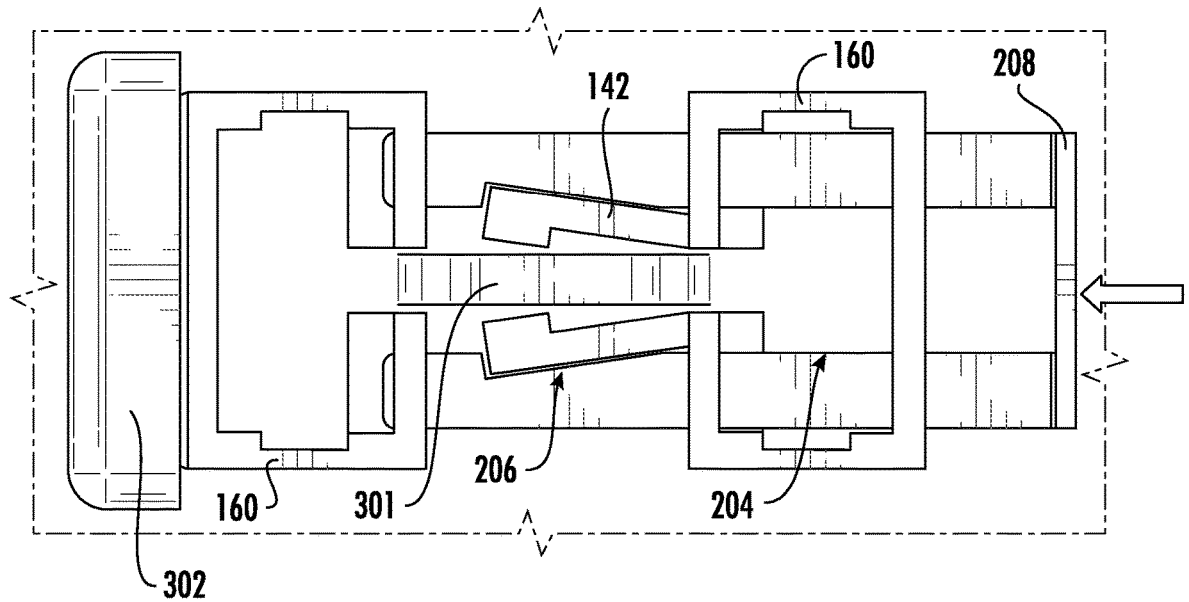
FIG. 10 is a bottom-up view of an embodiment of a cable mounting clamp in a partially inserted position accordance with still other embodiments of the present disclosure.
Figure 11:
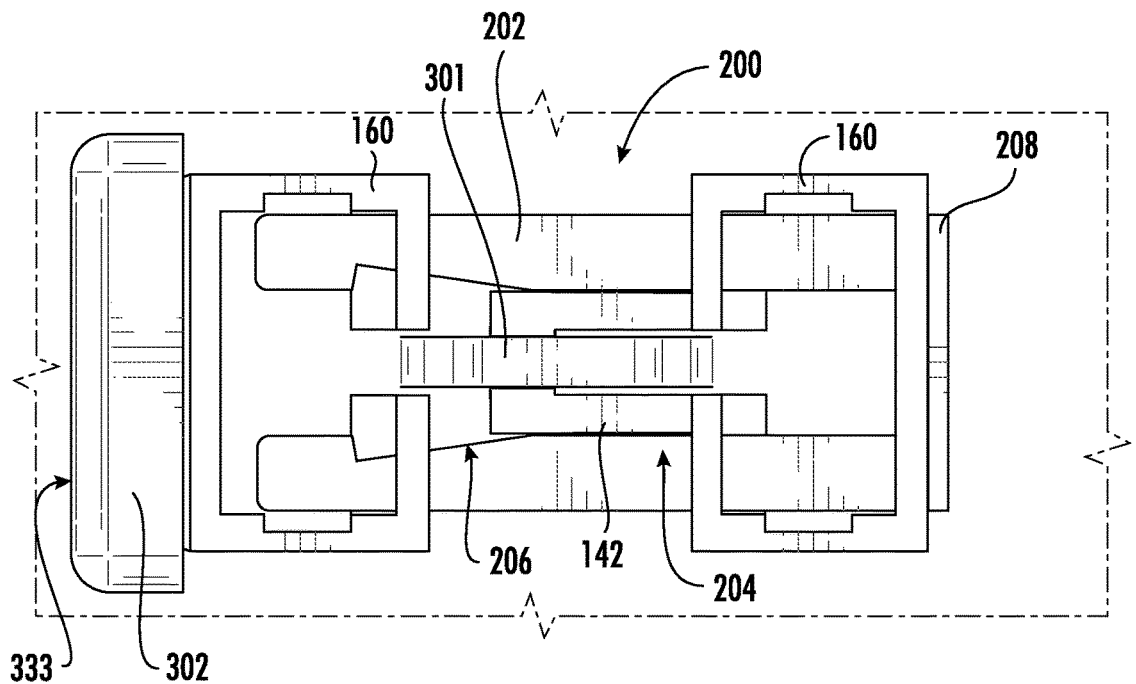
FIG. 11 is a bottom-up view of an embodiment of a cable mounting clamp in a fully inserted position accordance with still other embodiments of the present disclosure.

FIGS. 8-9 provide perspective views of exemplary embodiments of insertion of the fork structure 200 into the base 100. FIG. 8 provides a perspective view of the fork structure 200 partially inserted through the fork opening 120 with some distance along the longitudinal direction between the stop wall 208 and the base 100. The perspective view in FIG. 8 corresponds substantially with the views provided with regard to FIGS. 6-7. FIG. 9 provides a perspective view of the fork structure 200 fully inserted through the fork opening 120 with the stop wall 208 abutting the base 100. FIGS. 10-11 provide bottom-up views of exemplary embodiments of insertion of the fork structure 200 into the base 100. FIG. 10 may correspond substantially to FIG. 8. FIG. 11 corresponds substantially to FIG. 9.

Figure 12:
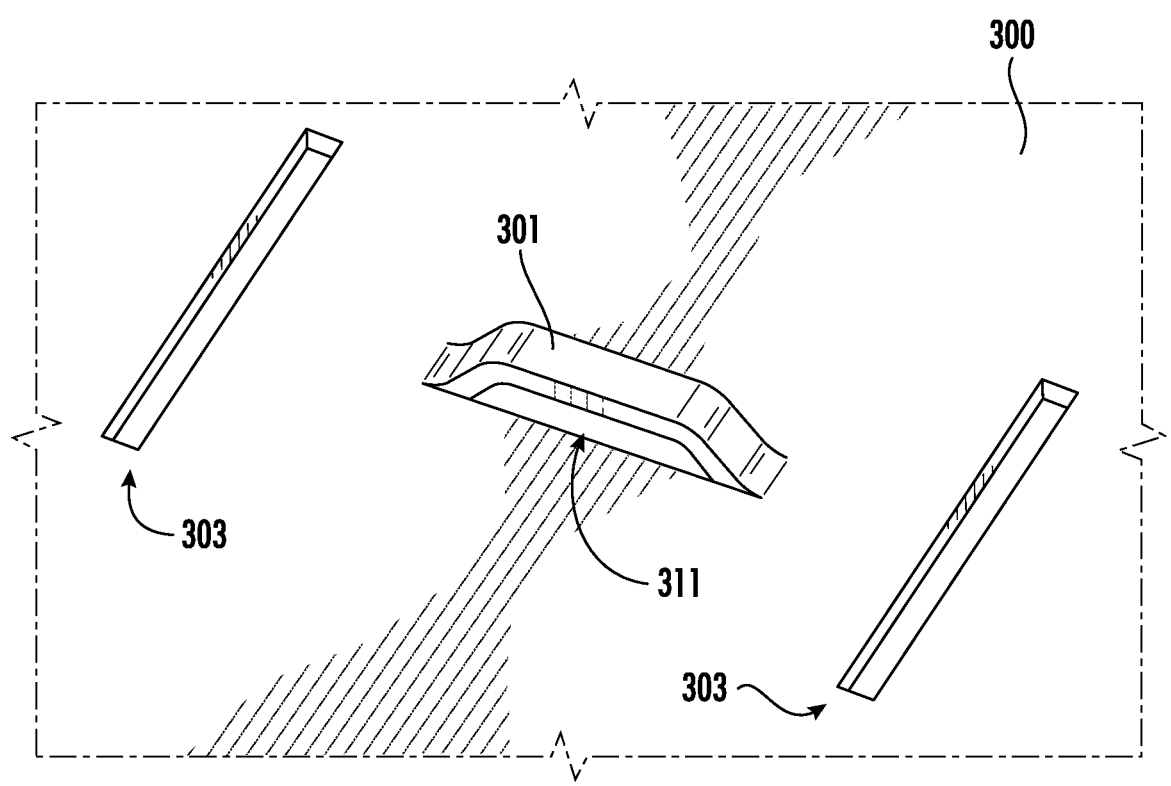
FIG. 12 is a perspective view of an embodiment of a surface of the enclosure at which the cable mounting clamp is attachable in accordance with embodiments of the present disclosure.

Referring now to FIG. 12, a perspective view of another embodiment of the surface 300 is provided. The embodiment provided in FIG. 12 is configured substantially similarly as depicted and described with regard to FIG. 5. In FIG. 12, the surface 300 forms a slot 303 extending non-parallel to the longitudinal direction. The slot 303 is extended along a depth into the surface 300. In certain embodiments, the slot 304 is extended perpendicular to the longitudinal axis 56 and/or the first bridge 301. Still particular embodiments may include a forward slot and an aft slot relative to a direction along the longitudinal axis 56 along which the fork structure 200 is inserted into the base 100. The first bridge 301 may be positioned along the longitudinal direction between the forward and aft slots 303.

Figure 13:
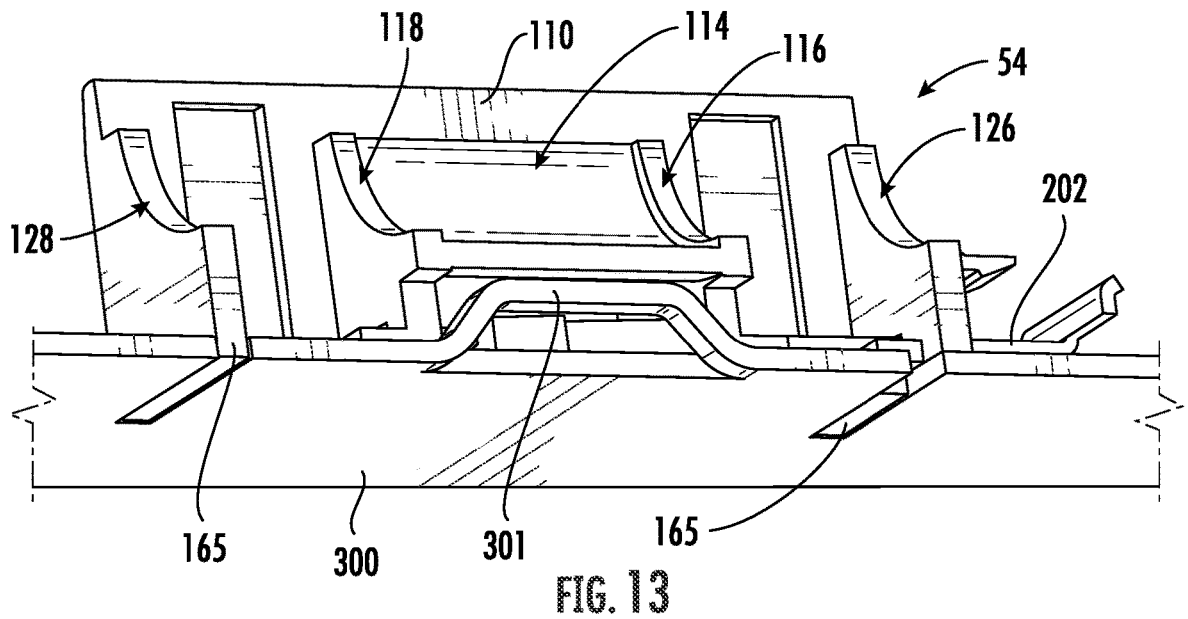
FIG. 13 is a perspective cross-sectional view of an embodiment of the cable mounting clamp in accordance with embodiments of the present disclosure.
Figure 14:
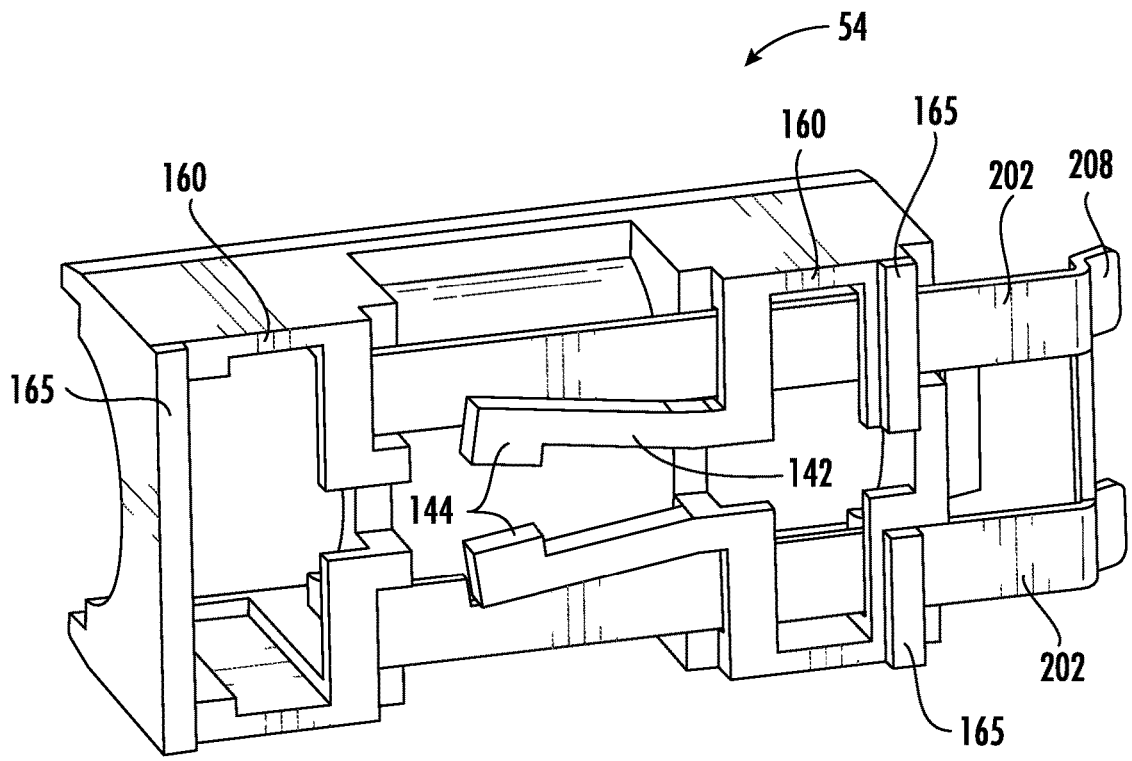
FIG. 14 is a bottom perspective view of an embodiment of the cable mounting clamp in accordance with embodiments of the present disclosure.

Referring now to FIG. 13, an exemplary embodiment of the cable mounting clamp 54 is provided. FIG. 13 provides a perspective cross sectional view of the cable mounting clamp 54 cut along the longitudinal axis 56 and affixed to an embodiment of the surface 300 such as provided in FIG. 12. FIG. 14 provides a perspective view of an embodiment of the cable mounting clamp 54 viewed from the bottom. The platform 160 at the base 100 forms a retaining wall 165 corresponding to the slot 303 formed in the surface 300. The retaining wall 165 is extendable into a depth of the surface 300 into the slot 303. The retaining wall 165 extended into the slot 303 may fix the base 100 along the longitudinal direction and orthogonal directions relative to the longitudinal axis 56. In an exemplary embodiment, the cable mounting clamp 54 may form a "rock and lock" setup at which the retaining wall 165 is inserted into the slot 303 at an angle relative to the surface 300, then the cable mounting clamp 54 is pivoted or rocked downward onto the surface 300 before the tong structure 140 engages the first bridge 301. As provided above, the fork structure 200 inserted into the base 100 may clamp the tong structure 140 at the first bridge 301, preventing movement of the base 100 along the height and allowing retention of the base 100 to the surface 300.

Figure 15:
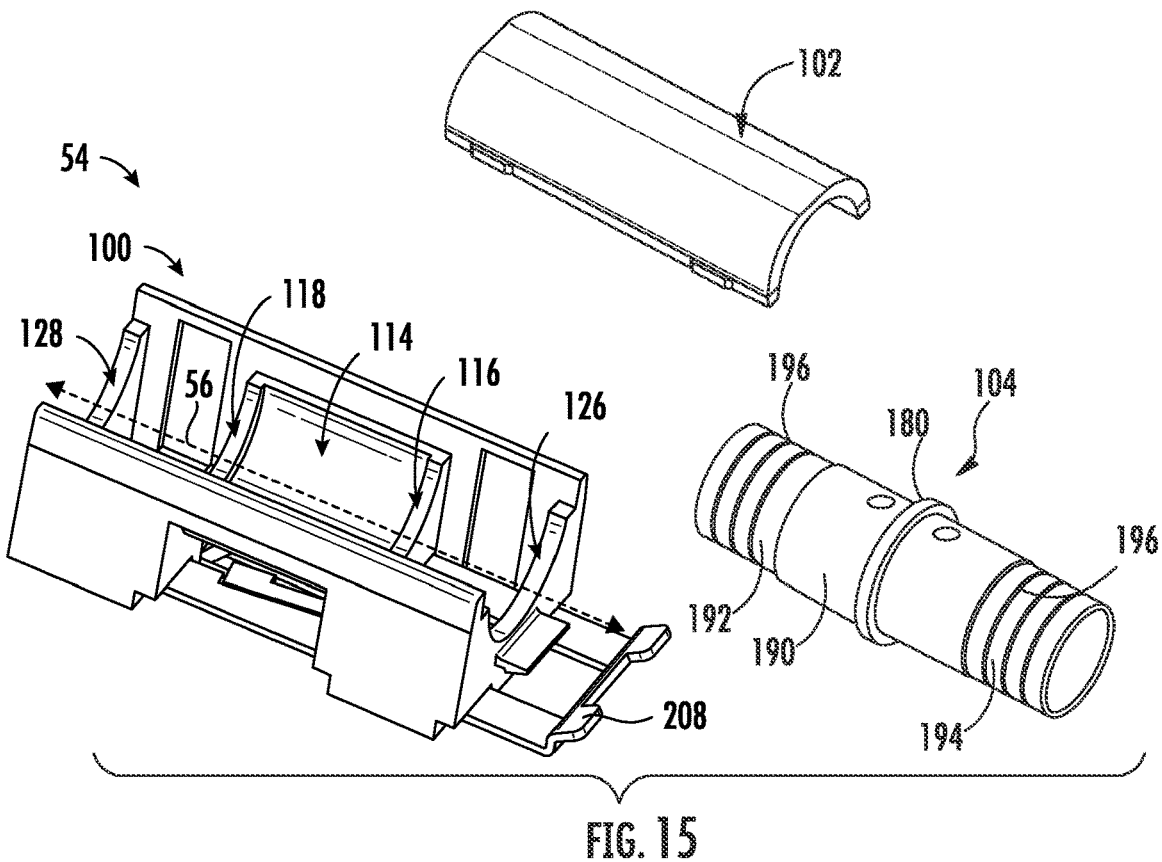
FIG. 15 is an exploded perspective view of components of a cable mounting clamp in accordance with further embodiments of the present disclosure.
Figure 16:
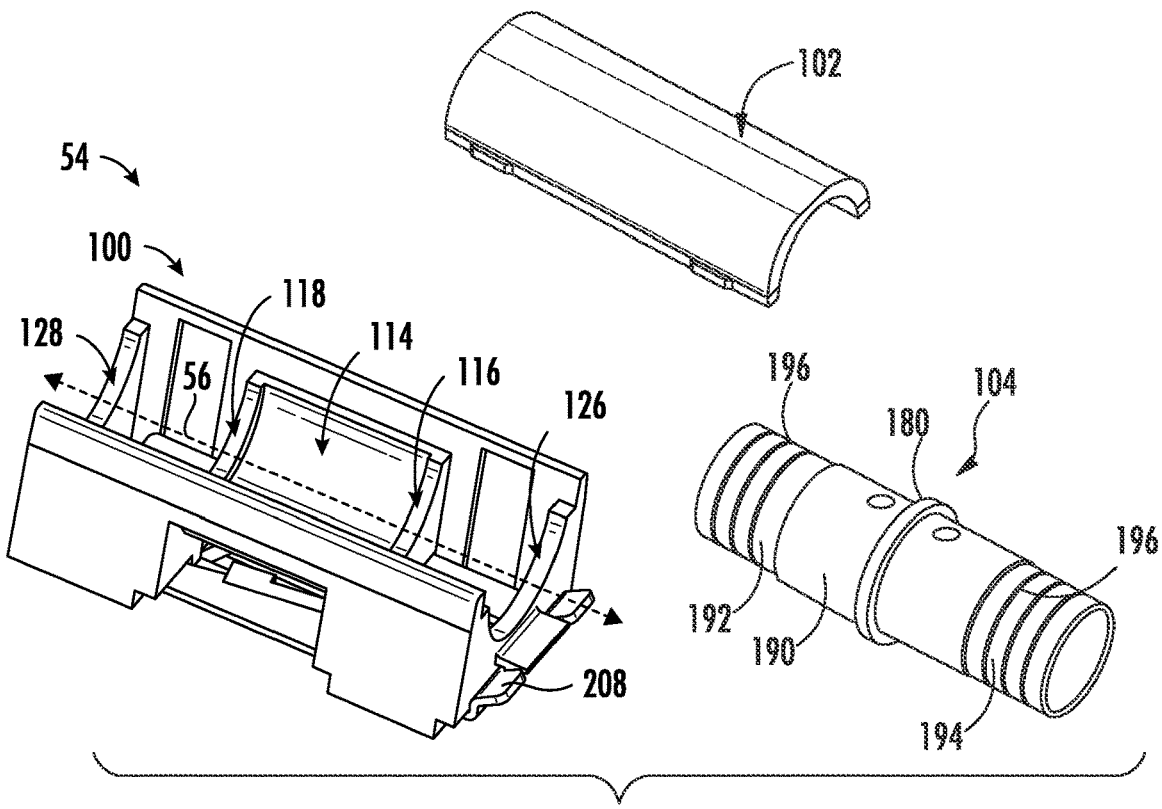
FIG. 16 is an exploded perspective view of components of a cable mounting clamp in accordance with further embodiments of the present disclosure.

Referring now to FIGS. 15-16, perspective exploded views of the clamp 54, cap 102, and roller tube 104 are provided. The embodiment of the clamp 54 in FIG. 15 illustrates a first position of the fork structure 200 partially inserted through the fork opening 120 into the base 100, such as depicted and described with regard to FIG. 10. The embodiment of the clamp 54 in FIG. 16 illustrates a second position of the fork structure 200 fully inserted through the fork opening 120 into the base 100, such as depicted and described with regard to FIG. 11.

Referring generally to FIGS. 1-19, in certain embodiments, the support ramp 114 may include first and second rails 116, 118, respectively. In some embodiments, the roller tube 104 may include one or more outer flanges 180, which may be an annular flange as shown. The outer flange 180 may, for example, be positioned generally at a longitudinal center point (e.g., along axis 56). In particular embodiments including only a single outer flange 180, such as depicted in FIG. 18, the roller tube 104 may be translatable such that the single outer flange 180 can float between and selectively contact one of the first rail 116 or second rail 118. For example, the roller tube 104 can slide along the axis 56 in one direction until the flange 180 contacts the first rail 116, and can slide along the axis 56 in the opposite direction until the flange 180 contacts the second rail 118. Such arrangement of the outer flange 180 floating between the rails 116, 118 also advantageously reduces or prevents the risk of the roller tube 104 becoming unsecured from the base 100.

Figure 19:
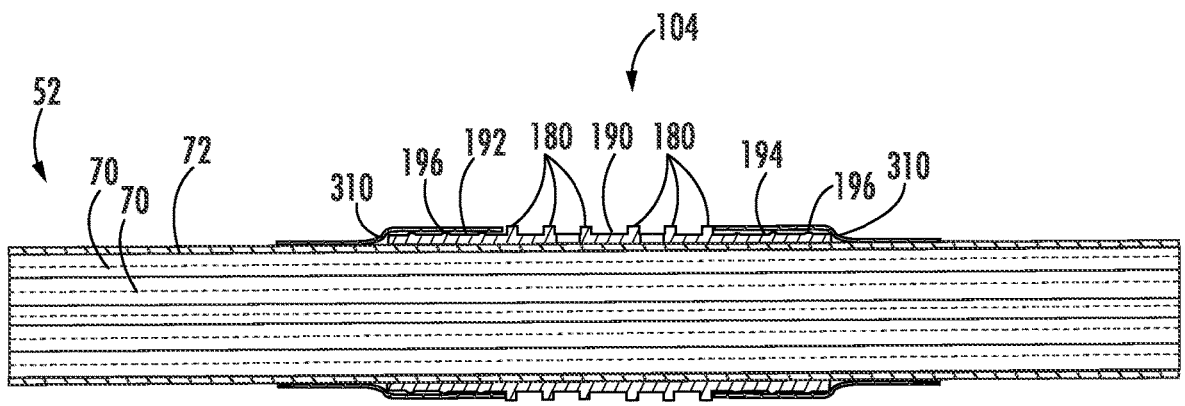
FIG. 19 is a cross-sectional view of an exemplary embodiment of a cable assembly of the fiber optic distribution enclosure in accordance with embodiments of the present disclosure.

In other embodiments, as illustrated in FIG. 19, roller tube 104 may include a plurality of outer flanges 180, each of which may be an annular flange as shown. The outer flanges 180 may, for example, be spaced apart from each other along the axis 56. Further, in some embodiments as shown, cap 102 may be utilized, and one or more grooves 182 (each of which may be an annular groove) may be defined in an inner surface of the cap 102. Roller tube 104 may be translatable such that a different outer flange 180 may be in selective contact with each of the first rail 116 and second rail 118 in various positions along the axis 56. Further, in exemplary embodiments when the cap 102 is utilized, the roller tube 104 may be translatable such that each of the plurality of grooves 182 may selectively accommodate one or more of the plurality of outer flanges 180. Accordingly, in various different positions of the roller tube 104 along the axis 56, a different outer flange 180 may be in contact with each of the first rail 116 and second rail 118 and, if a cap 102 is utilized, a different outer flange 180 may be accommodated in each groove 182 or the groove 182 may be empty, depending on the position of the roller tube 104 along the axis 56.

In various embodiments, body 110 may form a third rail 126 substantially parallel to the first rail 116 and separated along the axis 56 from the first rail 116. Body 110 may further form a fourth rail 128 substantially parallel to the second rail 118 and separated along the axis 56 from the second wall 118. The third rail 126 and the fourth rail 128 may each be positioned outside of the first and second rails 116, 118 along the longitudinal axis 56. For instance, the third rail 126 may be formed proximate to the stop wall 208 relative to the first rail 116. The fourth rail 128 may be formed more distal from the stop wall 208 of the fork structure 200 relative to the second rail 118. In certain embodiments, the platform 160 (FIG. 10-11) is positioned at a bottom face from the first and third rails 116, 126, and another platform 160 is positioned at a bottom face from the second and fourth walls 118, 128.

In further exemplary embodiments, the roller tube 104 may be rotatably mounted on the support ramp 114, and rotatable about the axis 56 (e.g., relative to the support ramp 114). For example, roller tube 104 may be positioned in the inner channel 112 such that the roller tube 104 extends along the axis 56. Further, the roller tube 104 may be in contact with the support ramp 114. Rotation about the axis 56 may be relative to both the base 100 and the cap 102 (if utilized).

Figure 17:
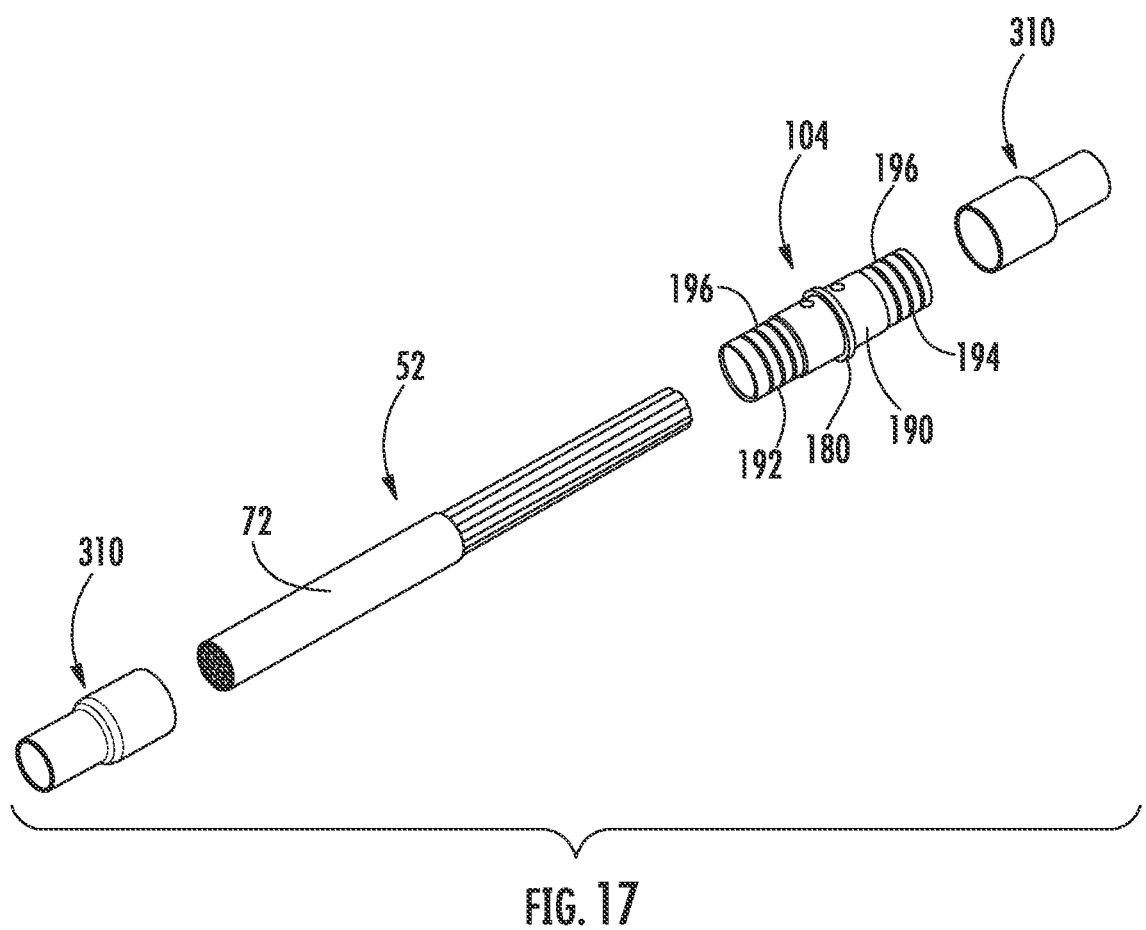
FIG. 17 is an exploded perspective view of an exemplary embodiment of a cable assembly of the fiber optic distribution enclosure in accordance with embodiments of the present disclosure.
Figure 18:
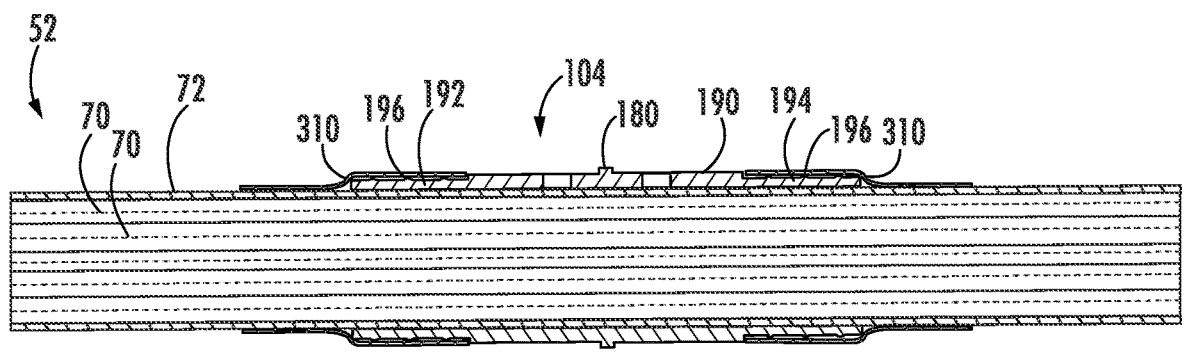
FIG. 18 is a cross-sectional view of an exemplary embodiment of a cable assembly of the fiber optic distribution enclosure in accordance with embodiments of the present disclosure.

Referring now to FIGS. 17-19, in some embodiments, roller tube 104 may include a central portion 190, a first end portion 192, and a second end portion 194. The first and second end portions 192, 194 extend in opposite directions from the central portion 190, such as in opposite directions along the axis 56. In some embodiments, the outer flange(s) 180 may be disposed on the central portion 190. In some embodiments, the first and second end portions 192, 194 may each include one or more ribs 196, which may be annular ribs as shown.

Further, in some embodiments, clamp 54 may include one or more heat shrink tubes 310. Each heat shrink tube 310 may be connected to the roller tube 104. For example, in some embodiments as shown, a heat shrink tube 310 may be connected to and extend from the first end portion 192, and a heat shrink tube 310 may be connected to and extend from the second end portion 194. In some embodiments, ribs 196 may contact the heat shrink tube(s) 310 and assist in maintaining the location of the heat shrink tube(s) 310 by preventing the heat shrink tube(s) 310 from slipping from the roller tube 104 (such as the end portions 192, 194 thereof).

Embodiments of the clamp 54 and enclosure 10 provided herein may further illustrate one or more steps of a method for mounting a cable to an enclosure. The method includes translating a fork structure along a longitudinal direction into an opening at a base at which a cable positioned, wherein the cable is extended along the longitudinal direction. In various embodiments, translating the fork structure into the opening at the base includes sliding prongs of the fork structure into contact with members of the tong structure.

The method further includes compressing members of a tong structure at the base toward a longitudinal axis via translating the fork structure into sliding contact with the tong structure, wherein compressing the members positions teeth at the tong structure within an opening at a bridge to restrain movement of the base. In certain embodiments, compressing members of the tong structure includes compressing members toward the longitudinal axis. In still certain embodiments, compressing members of the tong structure at the base toward the longitudinal axis includes pressing a longitudinal face of the fork structure against members of the tong structure.

In particular embodiments, translating the fork structure into the opening at the base includes sliding an angled face of the fork structure into contact with an angled face at the tong structure. In still particular embodiments, compressing members of the tong structure at the base toward the longitudinal axis includes pressing a longitudinal face of the fork structure against members of the tong structure after sliding the angled face of the fork structure into contact with the angled face at the tong structure.

In some embodiments, the method includes abutting a stop wall of the fork structure to the base when prongs of the fork structure are fully inserted through the opening at the base.

In still various embodiments, the method includes removing the fork structure from the base to allow for movement of the base relative to a surface at which the base is attached when the teeth are positioned within the opening at the bridge.

Referring now to FIGS. 20-23, perspective views of embodiments of a cable mounting clamp 54 are provided. Embodiments provided in FIGS. 20-22 may form an outback clamp including a roller tube forming a sleeve substantially surrounding a cable. One or more bridges or bridge lances, such as a first bridge, is formed at the roller tube. One or more additional bridges or bridge lances, such as a second bridge, is formed at a surface of the enclosure. The bridges each extend along a length of the roller tube co-directional to an extension of the cable through the roller tube. A strap, such as a hook and loop strap, is extendable through the bridges formed at the roller tube and the surface, such as to wrap around the roller tube and through the bridges. The bridges may be positionable substantially side-by-side or adjacent with one another. For instance, the bridges each extend co-directional to one another. The bridges may furthermore extend co-directional to an extension of the cable through the roller tube. The roller tube may affix directly to the surface such that the roller tube is positioned side-by-side with the bridge at the surface of the enclosure. In various embodiments, the bridge formed at the roller tube is a unitary, integral, monolithic structure with a substantially cylindrical body. In still certain embodiments, the bridge formed at the surface is a unitary, integral structure formed with surface at the enclosure. The cable may be configured to extend through the roller tube along the longitudinal direction. The strap may be configured to extend through the bridge along a direction perpendicular, oblique, or generally non-parallel to the longitudinal direction.

Figure 20:
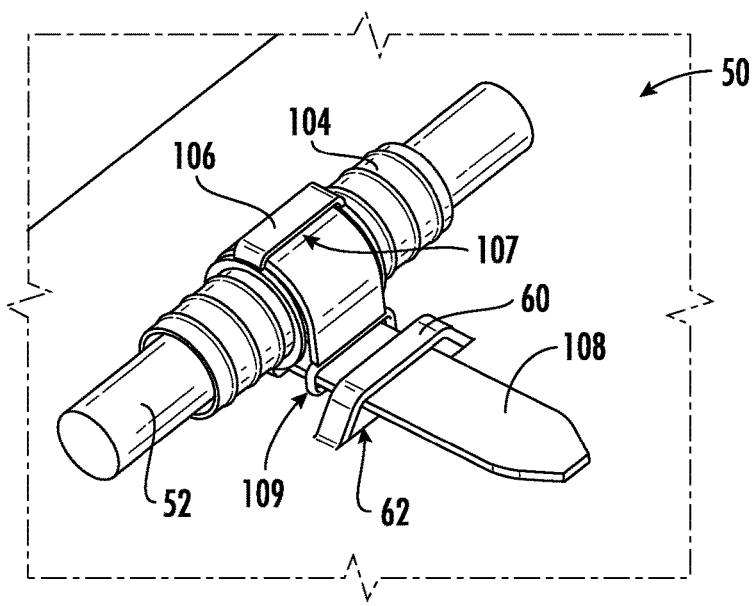
FIG. 20 is a perspective view of an embodiment of a cable mounting clamp and fiber optic distribution enclosure in accordance with embodiments of the present disclosure.
Figure 21:
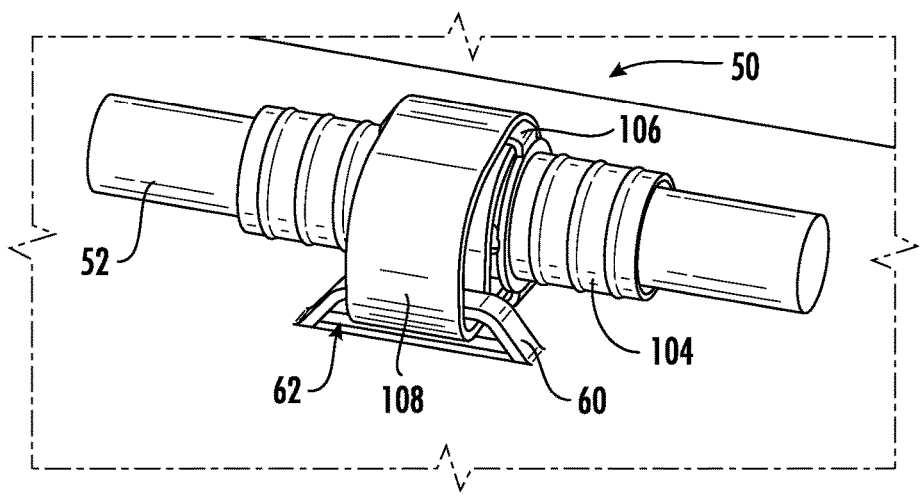
FIG. 21 is a perspective view of an embodiment of a cable mounting clamp and fiber optic distribution enclosure in accordance with embodiments of the present disclosure.
Figure 22:
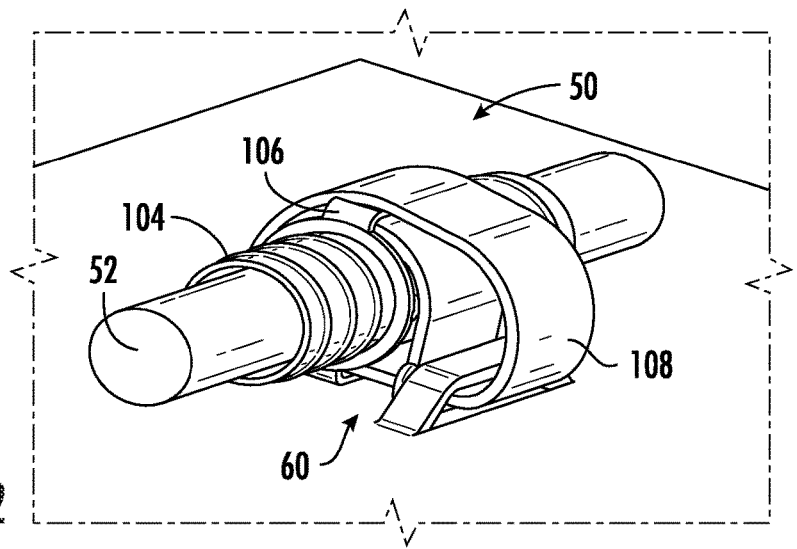
FIG. 22 is a perspective view of an embodiment of a cable mounting clamp and fiber optic distribution enclosure in accordance with embodiments of the present disclosure.

Embodiments provided herein may be attached to one or more bridge links 60 at the enclosure 10, such as the first bridge 301 or the second bridge 302 depicted in FIG. 5. Embodiments provided in FIGS. 20-22 depict the cable 52 mounted to a surface 300, such as described in various embodiments herein. The clamp 54 provided in FIGS. 20-22 includes one or more embodiments of the roller tube 104 such as described above. In a particular embodiment, the roller tube 104 forms a separable structure from an exterior jacket 72 or other component of the cable 52. The roller tube 104 may generally form a sleeve configured to surround or substantially surround the cable 52.

The roller tube 104 includes one or more bridge lances or bridges 106 extending along a length of the roller tube 104. The bridge 106 may be formed as an integral, unitary, monolithic structure with the roller tube 104, such as integral with a substantially cylindrical body of the roller tube 104. The bridge 106 and the roller tube 104 may be configured to extend co-directional to an extension of the cable 52 through the roller tube 104. The bridge 106 at the roller tube 104 may furthermore extend co-directional to the bridge 60 at the surface. The bridges 60, 106 may be aligned substantially side-by-side or adjacent with one another. A retention band, such as a belt or strap 108, is extendable around the roller tube 104 and through an opening 107 formed by each bridge 106 at the roller tube 104. The strap 108 is furthermore extendable through an opening 62 formed at the bridge 60 at the surface. It should be appreciated that the opening 62 may correspond to the first bridge opening 311 or the second bridge opening 312, such as depicted and described in regard to FIG. 5. In certain embodiments, the strap 108 and the bridge 106 may together form a hook and loop strap, in which a first side of the strap 108 is configured to removably latch, attach, or adhere to a second side of the strap 108 opposite of the first side. The strap 108 may include an end 109 from which a belt of the strap is extending and through which the strap 108.

Figure 23:
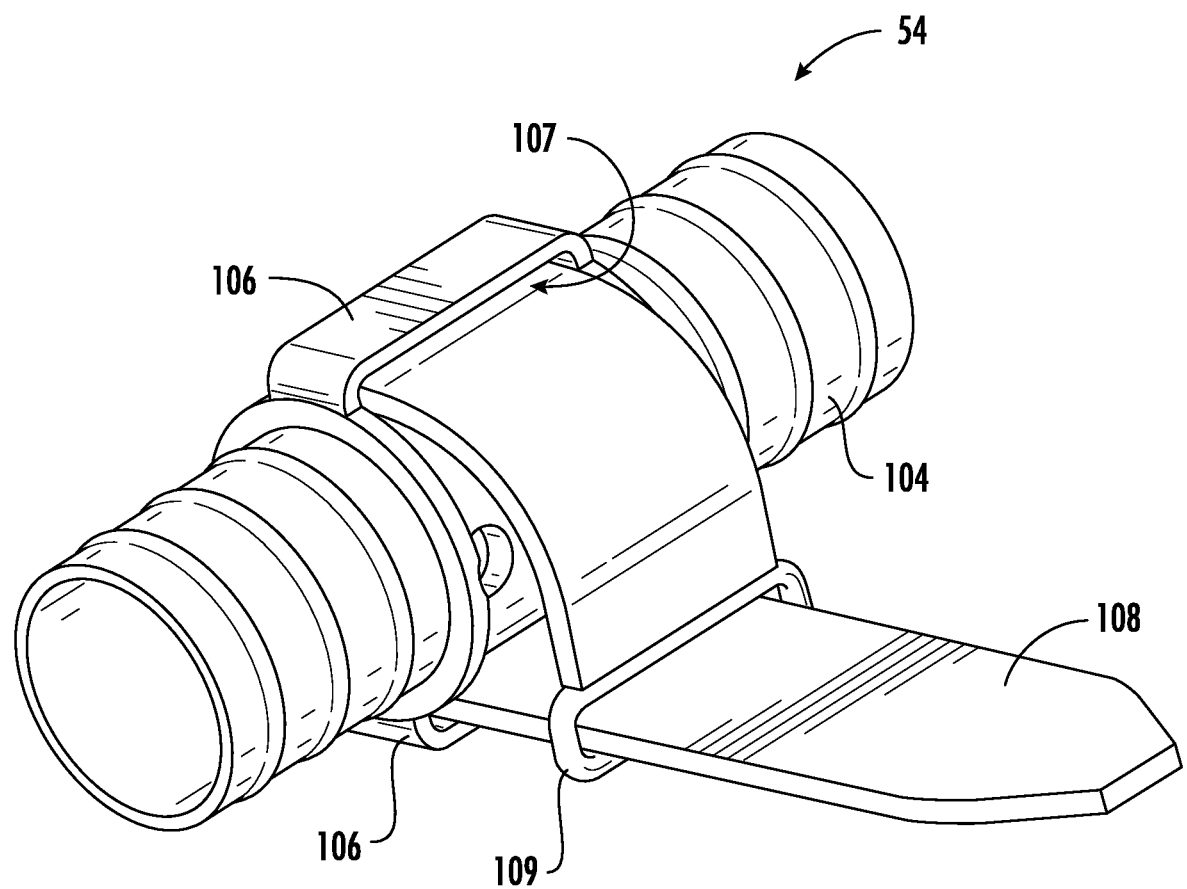
FIG. 23 is a perspective view of an embodiment of a cable mounting clamp in accordance with embodiments of the present disclosure.

In various embodiments, the roller tube 104 includes a plurality of bridges 106. Certain embodiments include bridge 106 formed at an upper half of roller tube 104. Referring to FIG. 23, the embodiment depicted further illustrates the roller tube 104 forming at least one bridge 106 at a lower half of the roller tube 104. The upper half bridge may be formed at a substantially top dead center or zero degree location. The lower half bridge may be formed at a substantially bottom dead center or 180 degree location. The lower half bridge may particularly abut the surface. The lower half bridge is positioned generally between a body of the roller tube 104 and the surface. The strap 108 may loop around the roller tube 104 one or more times through the opening 107 at bridge 106 and extend through the opening 62 at bridge 60 connected to the surface. The strap 108 may additionally loop one or more times around the roller tube 104 outside of the bridge 106, such as depicted in FIGS. 21-22. In still various embodiments, a single strap 108 may loop around a plurality of roller tubes 104 utilizing a single bridge at the surface 300 (e.g., bridge 301, 302). Such an embodiment may desirably increase capacity for cable assemblies at the enclosure 10. Various embodiments may include the strap 108 attaching the surface 300 to a greater plurality of smaller-diameter cables relative to a lesser plurality of relatively larger-diameter cables.

Cable assemblies 50 in accordance with the present disclosure include a cable 52 and one or more cable mounting clamps 54. The clamps 54 may be installable onto a cable 52 by a user, or may be factory pre-installed on the cable 52. In exemplary embodiments as shown, cable 52 is a fiber optic cable 52 which includes a plurality of optical fibers 70 disposed within an outermost exterior jacket 72. Mounting of a clamp 54 on a surface may, in exemplary embodiments, further mount the associated cable assembly 50 and cable 52 thereof, thus efficiently, securely and removably positioning the cable 52 on the surface.

When installed, a cable 52 may be inserted through a roller tube 104. Additionally, in some embodiments as shown, cable 52 may be inserted through the heat shrink tube(s) 310 that are connected to the roller tube 104, such that the heat shrink tube(s) 310 are also connected to the cable 52. In these embodiments, the heat shrink tube(s) 310 may be shrunk onto the cable 52 and roller tube 104. Because the roller tube 104 is disposed in the inner channel 112, the cable 52 may further extend through the inner channel 112, such as along the axis 56. Cable 52 may be generally fixed relative to the roller tube 104, such as in some embodiments due to contact by the heat shrink tube(s) 310 and/or epoxy or another suitable binder disposed between the cable 52 and roller tube 104, and thus may be generally not movable relative to the roller tube 104. However, advantageously, the cable 52 may be translatable with the roller tube 104 along the longitudinal axis 56 and, in some embodiments, rotatable with the roller tube 104 along the longitudinal axis 56.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cable mounting clamp for mounting a cable to a surface, the cable mounting clamp comprising:
   a base removably connectable to the surface, the base comprising an outer body which defines an inner channel and a support ramp disposed within the inner channel, the inner channel extending along a longitudinal direction co-directional to a longitudinal axis;

a tong structure connected to the base, the tong structure extending along the longitudinal direction and between the inner channel and the surface; and a fork structure slidable along the longitudinal direction, wherein the fork structure comprises a pair of prongs extended along the longitudinal direction, wherein each prong is in sliding contact with the tong structure, wherein each prong forms a longitudinal face extending along the longitudinal direction, and wherein each prong forms an angled face extending away from the longitudinal axis and corresponding to an angled face at the tong structure.

2. The cable mounting clamp of claim 1, wherein the base comprises a pair of platforms at which the base contacts the surface, the tong structure extending along the longitudinal direction between the pair of platforms.

3. The cable mounting clamp of claim 2, wherein the fork structure is slidable along the pair of platforms.

4. The cable mounting clamp of claim 1, the fork structure comprising a stop wall extending along a height direction, the pair of prongs extending along the longitudinal direction from the wall.

5. The cable mounting clamp of claim 4, wherein a hook is formed at a distal end of at least one prong of the pair of prongs from the stop wall.

6. The cable mounting clamp of claim 1, wherein the base forms an opening through which the pair of prongs of the fork structure are extendable.

7. The cable mounting clamp of claim 1, wherein the tong structure comprises a pair of members each extending substantially along the longitudinal direction, wherein each member forms a tooth at a terminal end of each member.

8. The cable mounting clamp of claim 7, wherein the pair of members is sprung along an orthogonal direction relative to the longitudinal direction.

9. The cable mounting clamp of claim 7, wherein the prongs of the fork structure are configured to apply a force at the pair of members of the tong structure toward the longitudinal axis when the fork structure is in contact with tong structure.

10. A fiber optic distribution enclosure for a fiber optic cable, the enclosure comprising:

a surface comprising a first bridge extended along a longitudinal direction co-directional to a longitudinal axis;

a cable mounting clamp for mounting a cable to a surface, the cable mounting clamp comprising:

a base removably connectable to the surface, the base comprising an outer body which defines an inner channel and a support ramp disposed within the inner channel, the inner channel extending along a longitudinal direction;

a tong structure connected to the base, the tong structure extending along the longitudinal direction and between the inner channel and the surface; and a fork structure slidable along the longitudinal direction, wherein the fork structure comprises a pair of prongs extended along the longitudinal direction, wherein each prong is in sliding contact with the tong structure, wherein each prong forms a longitudinal face extending along the longitudinal direction, and wherein each prong forms an angled face extending away from the longitudinal axis and corresponding to an angled face at the tong structure.

11. The enclosure of claim 10, wherein the surface forms a slot extending non-parallel to the longitudinal direction.

12. The enclosure of claim 11, wherein the base forms a retaining wall corresponding to the slot, and wherein the retaining wall is extendable along a height direction into the slot.

13. The enclosure of claim 10, wherein the surface comprises a second bridge extending non-parallel to the first bridge.

14. The enclosure of claim 13, wherein the base forms a retaining wall corresponding to the second bridge, and wherein the retaining wall is extendable into an opening formed by the second bridge.

15. The enclosure of claim 10, wherein the tong structure comprises a pair of members each extending substantially along the longitudinal direction, and wherein each member forms a tooth at a terminal end of each member.

16. The enclosure of claim 15, wherein the pair of members is sprung along an orthogonal direction relative to the longitudinal direction, and wherein the pair of prongs of the fork structure are configured to apply a force at the pair of members of the tong structure toward the longitudinal axis when the fork structure is in contact with tong structure.

17. The enclosure of claim 10, the fork structure comprising a stop wall extending along a height direction, the pair of prongs extending along the longitudinal direction from the wall.

18. The enclosure of claim 10, wherein a hook is formed at a distal end of at least one prong of the pair of prongs from a stop wall.

19. The enclosure of claim 10, wherein the base forms an opening through which the pair of prongs of the fork structure are extendable.

20. The enclosure of claim 19, wherein the pair of prongs of the fork structure is configured to extend co-directional to the longitudinal axis through the opening formed at the base.

* * * * *